(12) United States Patent
Wohlfarth

(10) Patent No.: US 6,484,117 B1
(45) Date of Patent: Nov. 19, 2002

(54) PREDICTIVE TEMPERATURE CONTROL SYSTEM FOR AN INTEGRATED CIRCUIT

(75) Inventor: Paul Dana Wohlfarth, Vernonia, OR (US)

(73) Assignee: Credence Systems Corporation, Fremont, CA (US)

( * ) Notice: Subject to any disclaimer, the term of this patent is extended or adjusted under 35 U.S.C. 154(b) by 0 days.

(21) Appl. No.: 09/548,884

(22) Filed: Apr. 13, 2000

(51) Int. Cl.[7] ............................................. G01K 11/00
(52) U.S. Cl. ....................................... 702/132; 702/99
(58) Field of Search ..................... 364/550; 361/103; 702/130, 127, 132

(56) References Cited

U.S. PATENT DOCUMENTS

| | | | |
|---|---|---|---|
| 5,287,292 A | * | 2/1994 | Kenny et al. ............... 364/550 |
| 5,805,403 A | * | 9/1998 | Chemla ..................... 361/103 |
| 6,055,489 A | * | 4/2000 | Beatty et al. ............... 702/130 |

* cited by examiner

*Primary Examiner*—John S. Hilten
*Assistant Examiner*—Douglas N Washburn
(74) *Attorney, Agent, or Firm*—Daniel J. Bedell; Smith-Hill and Bedell

(57) ABSTRACT

Variation in temperature of a digital logic circuit that temporarily increases its heat production after a digital input signal changes state is limited using a heater that applies heat to the digital logic circuit at a variable rate. A control circuit monitors all of the circuit's digital input signals and temporarily decreases the rate at which the heater applies heat to the digital logic circuit after each state change in a digital input signal. The amount of temporary reduction in heater output is sized to substantially match the amount of temporary increase in logic circuit heat production so that the temperature of the logic circuit remains largely unaffected. A feedback circuit is also provided to monitor the temperature of the digital logic circuit and to further adjust the heater output so as to help maintain the logic circuit at a desired temperature.

Figure 1:
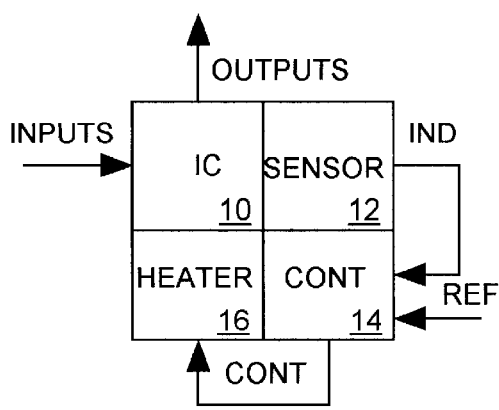

22 Claims, 4 Drawing Sheets

PREDICTIVE TEMPERATURE CONTROL SYSTEM FOR AN INTEGRATED CIRCUIT

BACKGROUND OF THE INVENTION

1. Field of the Invention

The present invention relates in general to integrated circuits and in particular to a temperature control system for an integrated circuit.

2. Description of Related Art

In many applications it is important for transistors forming logic circuit to switch with constant, predictable switching speeds. However, the switching speed of a transistor, particularly a metal oxide semiconductor (MOS) transistor, is highly temperature sensitive; as a transistor warms up, it reduces the speed with which it turns on an off. A transistor's temperature is influenced, for example, by its ambient temperature, the size, number and proximity of heat sources and sinks in its immediate vicinity, and by the heat transfer efficiency of its surrounding media. Since a transistor itself is a variable heat source, generating substantial heat when it is on and very little heat when it is off, the manner at which the transistor is operated can also influence its temperature. As the duty cycle of a transistor increases, it tends to generate more heat, warm itself up, and therefore slow down. This effect is tempered to some extent in complementary metal oxide semiconductor (CMOS) integrated circuits where n-channel (nMOS) and p-channel (pMOS) transistors forming logic gates are paired and arranged such that the nMOS and pMOS transistors of each pair have opposite switching states. When one transistor of a pair is on, the other transistor of the pair is off. Thus the amount of heat the pair generates tends to be independent of the switching states of the transistors, provided the transistors are well matched.

Nonetheless, the temperature of a CMOS circuit can fluctuate not only due to variations in its ambient temperature but also due to changes in its frequency of operation. When a CMOS transistor pair changes state, the pMOS transistor turns on (or off) at the same time the nMOS transistor turns on (or off). But the two transistors do not turn on or off instantly; there is a period of time during a state change when both transistors are in their active regions, between fully off and fully on. During that time both transistors generate heat, and the total amount of heat they collectively generate per unit time is greater during state changes than between them. CMOS logic gates change state when their input signals change state. Thus as the frequency of a CMOS logic circuit input signal increases, the rate at which the logic gates forming that circuit change state also increases, and so too does the heat the logic gates generate. That is why CMOS circuits get hotter when they operate at higher frequencies. Therefore, in applications requiring a high degree of switching speed stability, it is helpful to control the temperature of an integrated circuit (IC), particularly when a circuit's inputs change state at varying frequencies.

FIG. 1 illustrates a well-known feedback system for controlling the temperature of a CMOS or other kind of IC 10 so as to stabilize the switching speed of its transistors. A sensor 12 monitors the temperature of IC 10 and generates an indicating signal (IND) having a parameter indicative of the IC's temperature. Sensor 12 may be, for example a thermistor in contact with IC 10. A control circuit 14 compares the IND signal to a reference signal (REF) and supplies an output control signal (CONT) to an external heater 16 near IC 10. When the magnitude of the IND signal exceeds the magnitude of the REF signal, indicating for example that IC 10 is hotter than desired, control circuit 14 signals heater 16 to reduce the rate at which it generates heat, thereby allowing IC 10 to cool down. Conversely when the magnitude of the IND signal falls below the magnitude of the REF signal, indicating that IC 10 is cooler than desired, control circuit 14 signals heater 16 to increase the rate at which it generates heat, thereby warming IC 10. The magnitude of REF therefore controls the temperature of IC 10.

One limitation on the ability of the feedback system of FIG. 1 to closely control IC temperature is that it takes time for a change in temperature of IC 10 to be detected by sensor 12, and additional time for a change in heat generated by the external heater 16 to influence the temperature of IC 10. This feedback delay limits the accuracy with which the feedback system can control the temperature of IC 10 when the rate at IC 10 generates internal heat changes rapidly, as when there is an abrupt change in input signal frequency. The temperature of circuits in integrated circuit testers and other applications that change abruptly from inactive to full speed operation can undergo a rapid swing before the feedback system of FIG. 1 has time to compensate for the changed operating conditions.

Figure 2:
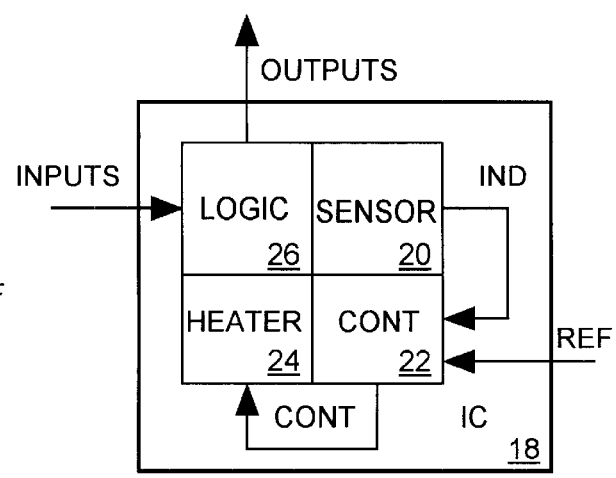

FIG. 2 illustrates an improved prior art temperature control system for an IC 18 that is topologically similar to that of FIG. 1 except that a sensor 20, control circuit 22 and heater 24 are implemented within IC 18 itself, with sensor 20 and heater 24 positioned as close as possible to the logic circuits 26 being temperature controlled. Sensor 20 monitors the temperature of logic circuit 26 and generates an indicating signal (IND) having a parameter indicative of the IC's temperature. For example sensor 20 may be a diode and the IND signal may be the diode's threshold voltage, a parameter that is highly sensitive to temperature. Or, as another example, sensor 12 may be a ring oscillator formed by gates implemented on IC 18 having a temperature sensitive frequency. Heater 24 can be implemented as a set of transistors that are turned on and off by the control signals CONT. This design reduces the feedback lag between temperature changes in logic circuit 26 and compensating changes the heat it receives from heater 24. However while sensor 20 may directly or indirectly sense the temperature of a particular part of IC 18, the sensed temperature may not be representative of the temperature or switching speed of all transistors on IC 18. The transistors forming logic circuit 26 are distributed in space and some of those transistors may be nearer sensor 20 or heater 24 than others. Also at various times the IC input signals may increase the frequency of operation of some portions of logic circuit 26 while decreasing the frequency of others. Thus the rate of internal heat generation within logic circuit 26 can vary from area-to-area of IC 18. When sensor 20 senses one area of IC 18 growing colder, controller 22 tells heater 24 to generate more heat, even though some parts of logic circuit 26 may already be growing warmer.

Figure 3:
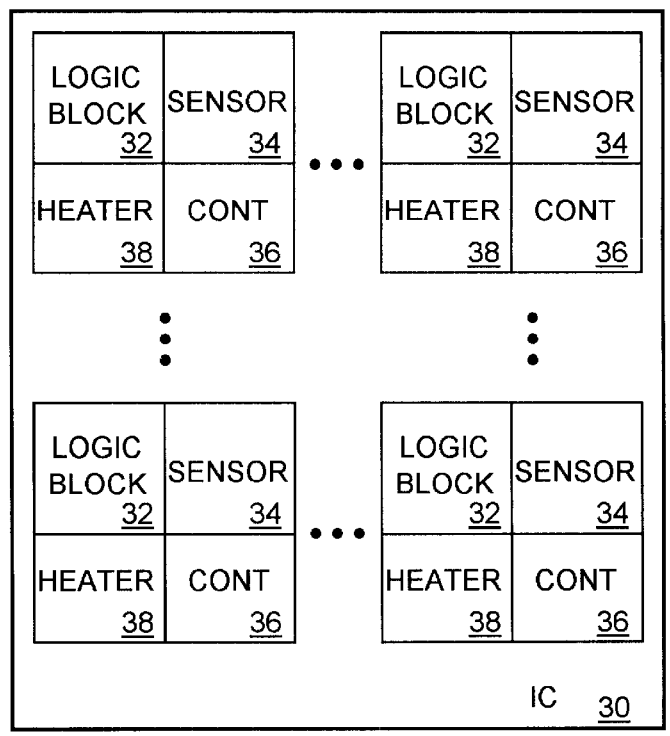

FIG. 3 illustrates a prior art temperature compensation system wherein the logic of an IC 30 is organized into a set of logic blocks 32, with each logic block 32 being provided with its own sensor 34, controller 36 and heater 38. Since this system localizes sensing and heating, the various logic blocks 32 are better controlled than in the centralized systems of FIGS. 1 and 2. While the system of FIG. 3 can be generally quite effective in controlling temperature of an IC subject to a slowly changing thermal environment, its ability to control the temperature of the transistors forming a given logic block 32 is still limited to some extent by lags in the feedback loop provided by sensor 34, controller 36 and heater 38. This feedback system is particularly vulnerable when a sudden change in the input signal frequency of a logic block 32 results in a sudden change in the amount of heat the logic block generates. Such an event can cause the transistor switching speed to briefly go out of its acceptable range before the feedback system has had time to detect the temperature change and to adjust the heat flow into the logic block.

What is needed is an improved temperature compensation system that quickly responds to changes in input signal frequency.

SUMMARY OF THE INVENTION

In accordance with one aspect of the invention, a temperature control system for an integrated circuit (IC) having one or more digital logic modules provides a separate heater circuit near each logic module for heating the logic module and a separate predictive control circuit for controlling each heater circuit. Each predictive control circuit monitors input signals supplied to its corresponding logic module. When any input signal changes state, the predictive control circuit signal the logic module's heater to temporarily reduce its heat output. A change in state of an input signal to a logic module will cause the logic module to temporarily increase the rate at which it generates heat, but the temporary reduction in heat generation rate of the heater circuit offsets the temporary increase in heat production of the logic module, thereby reducing logic module temperature fluctuation.

In accordance with another aspect of the invention, a feedback system senses the temperature of each logic module and further adjusts the rate at which the module's heater produces heat so as to maintain the logic module at a substantially constant temperature.

The temperature control system of the present invention is particularly suitable for controlling temperature of circuits in integrated circuit testers and other applications that change abruptly from being relatively inactive to full speed operation. Unlike systems employing only temperature sensing feedback, the system of the present invention predicts when a circuit is going to change its heat output and makes appropriate heater adjustments when the circuit changes its heat output rather than waiting until after the circuit temperature has already begun to change.

It is accordingly an object of the invention to provide a temperature control system for an integrated circuit which holds digital logic modules therein at a substantially constant temperature despite abrupt changes in the switching frequency of the module's input circuits.

The concluding portion of this specification particularly points out and distinctly claims the subject matter of the present invention. However those skilled in the art will best understand both the organization and method of operation of the. invention, together with further advantages and objects thereof, by reading the remaining portions of the specification in view of the accompanying drawing(s) wherein like reference characters refer to like elements.

BRIEF DESCRIPTION OF THE DRAWING(S)

Figure 4:
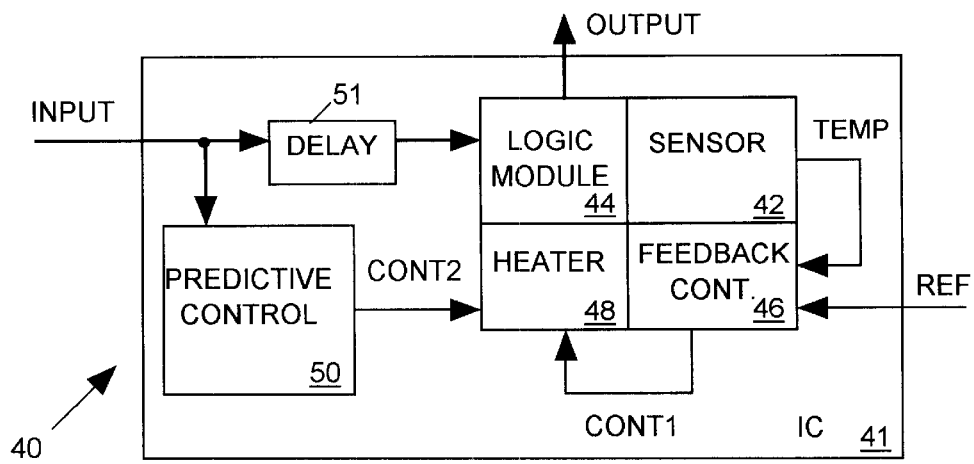
Figure 5:
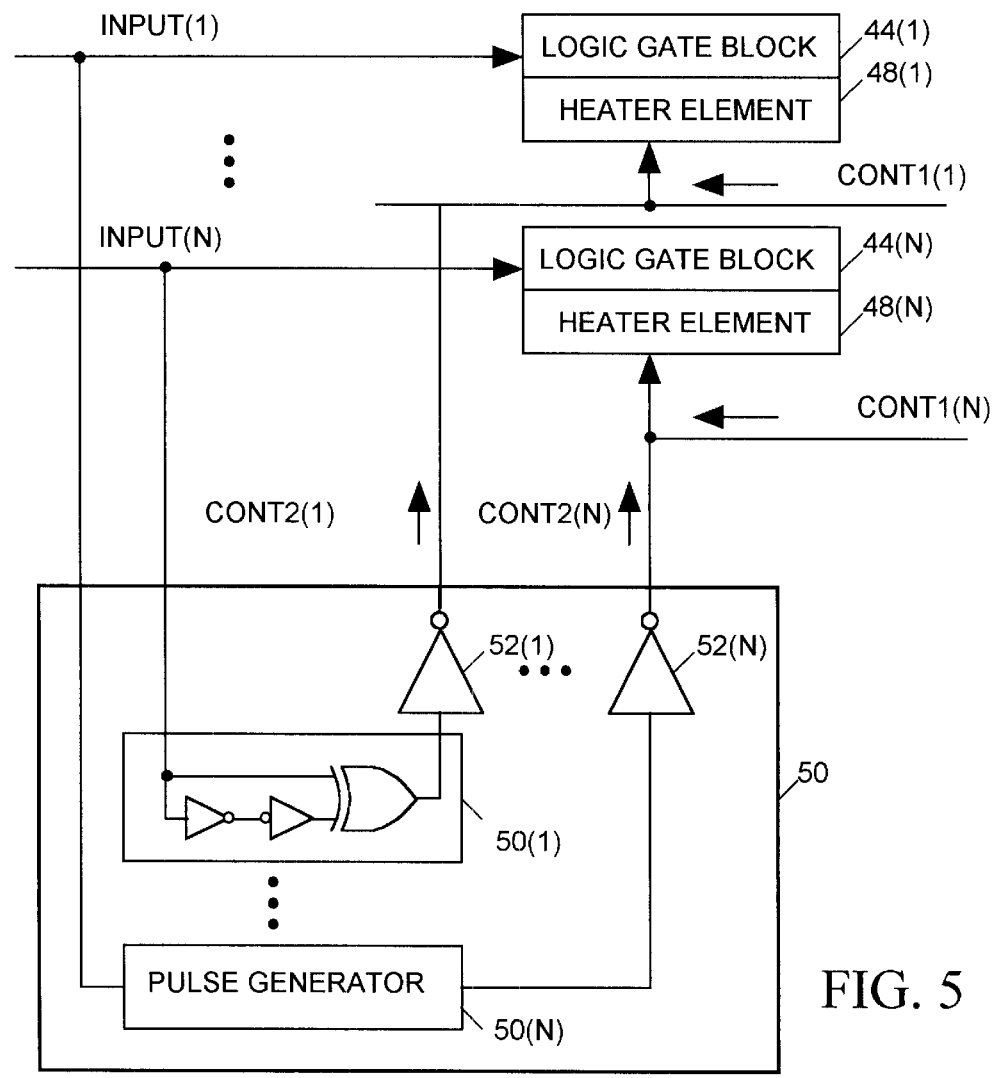
Figure 6:
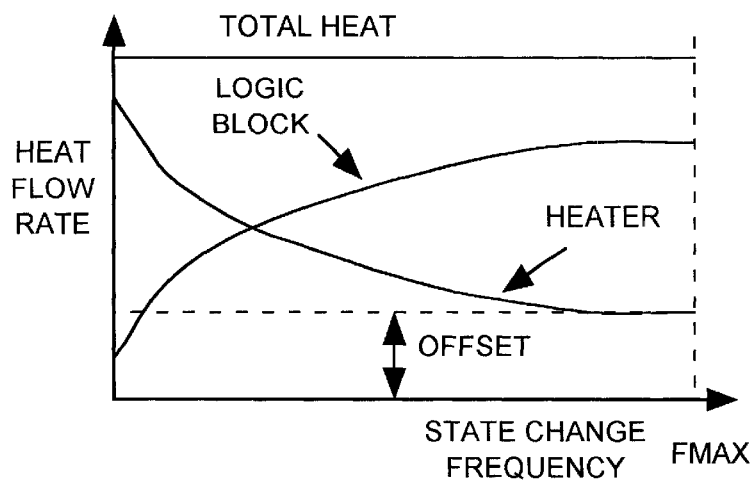
Figure 7:
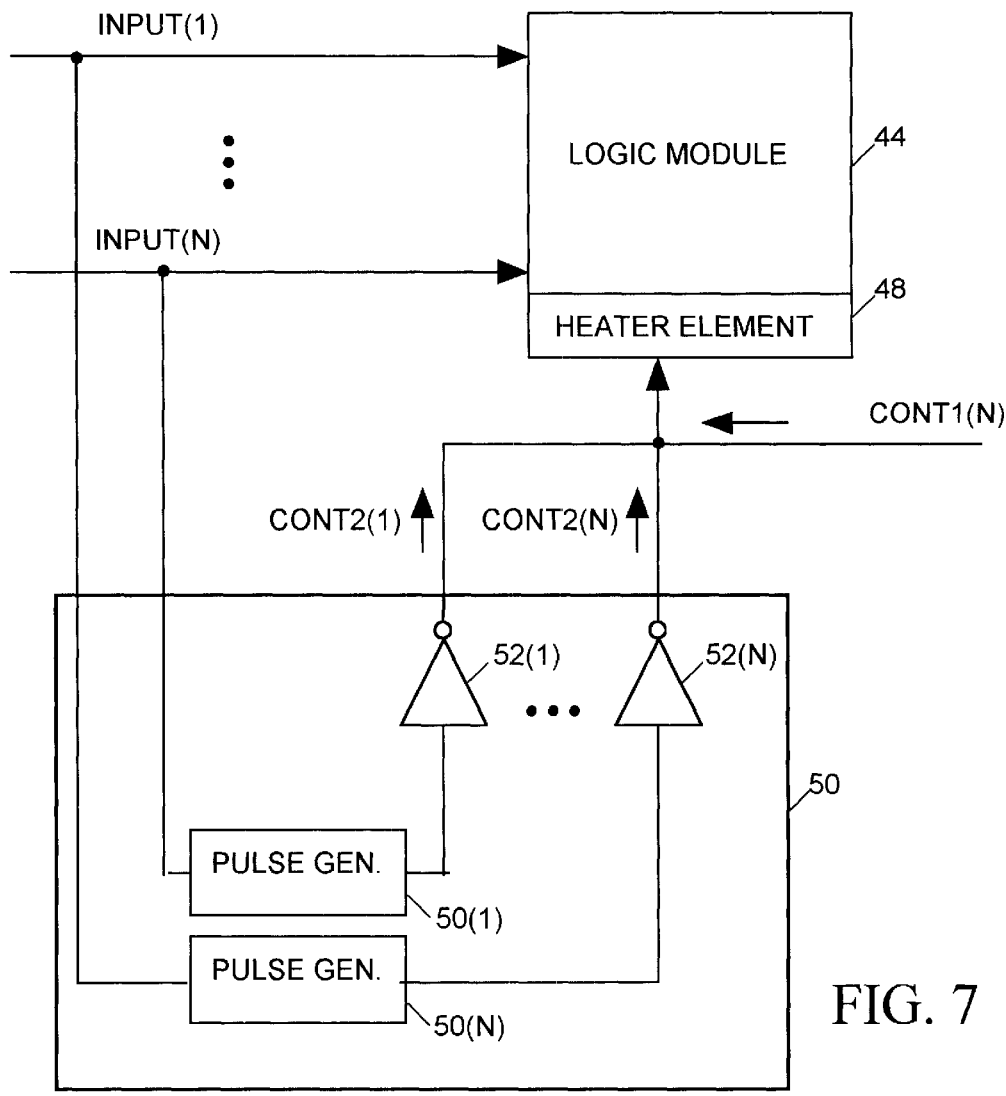
Figure 8:
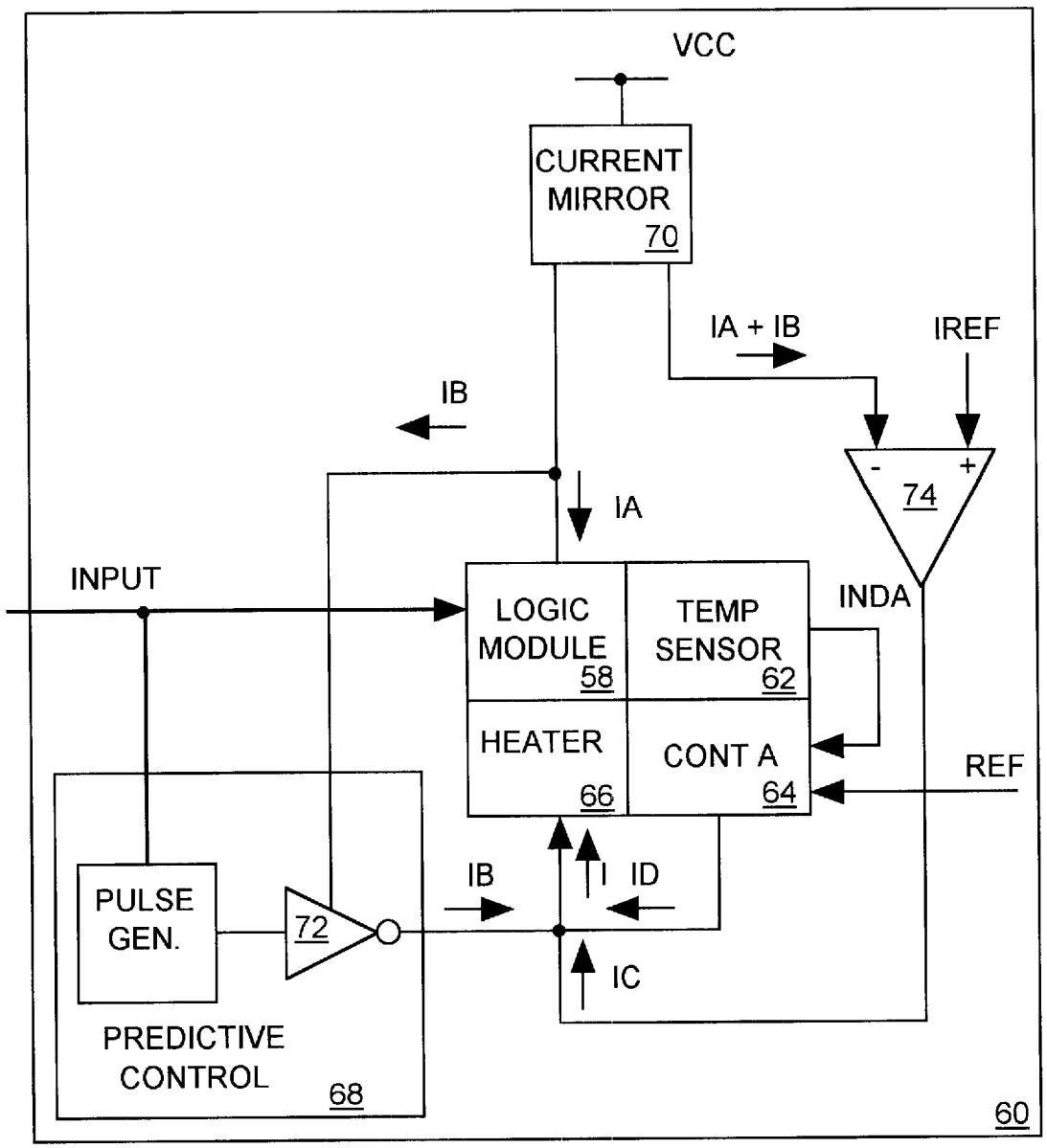

FIGS. 1–3 illustrates in block diagram form prior art systems for controlling the temperature of an integrated circuit, FIG. 4 illustrates in block diagram form a preferred embodiment of an integrated circuit temperature control system in accordance with the invention, FIG. 5 illustrates the predictive control circuit, heater and logic module of FIG. 4 in more detailed block diagram form, FIG. 6 is a graph illustrating the relationship between average heat flow rate output of a logic module of FIG. 5 and its corresponding heater as a function of the frequency of the logic module's input signal, and FIGS. 7 and 8 illustrate in block diagram form alternative embodiments of a temperature control system in accordance with the invention.

DESCRIPTION OF THE PREFERRED EMBODIMENT(S)

In applications where signal propagate rates through a digital circuit must be precisely controlled, transistors forming logic circuit within an integrated circuit (IC) should switch with a constant, predictable switching speed. However the switching speed of a transistor, particularly metal oxide semiconductor (MOS) transistors, is highly temperature sensitive; as a transistor warms up its switching rate slows. A IC's temperature is influenced, for example, by the ambient temperature of its surroundings, by the behavior of heat sources and sinks in its immediate vicinity, and by the heat transfer efficiency of its surrounding media. But since a transistor is itself a variable heat source, generating substantial heat when it is on and very little heat when it is off, the temperature of an IC can also be greatly influenced by the amount of heat generated by its internal transistors. In complementary metal oxide semiconductor (CMOS) integrated circuits where paired n-channel (nMOS) and p-channel (pMOS) transistors form logic gates, the nMOS and pMOS transistors of each pair have opposite switching states. When one transistor of a pair is on, the other transistor of the pair is off. The amount of heat the pair generates therefore tends to be independent of the switching states of the transistors, provided the transistors are well-matched.

However when a CMOS transistor pair changes state, the two transistors do not turn on or off instantly; there is a period of time during a stage change when both transistors are in their active regions, both generating heat, and the total amount of heat they generate per unit time is greater during state changes then when they reside in one switching state or another. Since CMOS logic gates change state when their input signals change state, an increase in the rate at which a CMOS logic circuit's input signals change state causes an increase in the rate of heat generation of the logic gates that respond to those input signals. Thus a CMOS circuit operating at a high frequency produces more heat than a CMOS circuit operating at a low frequency. If the increased heat resulting from an increase in operating frequency is allowed to warm an IC's transistors, their switching speed will decline.

As discussed above, prior art feedback control systems as illustrated in FIG. 1–3 control the temperature of CMOS or other kinds or transistors within an IC by monitoring a parameter influenced by the IC's temperature and adjusting the rate at which a heater implemented within or near the IC supplies heat to the IC. When the IC warms up (or cools down), the heater reduces (or increases) the amount of heat it supplies to the IC so that the IC remains within a narrow range of temperatures. Such feedback systems can work quite well to limit the range of slowly varying temperature changes within an IC, for example due to changes in ambient temperature of the IC, or slow changes in the frequency of its input signals. However when an abrupt increase or decrease in input signal frequency causes an abrupt change in heat generated by the IC's logic circuits, the feedback control system cannot respond quickly because it has an inherent lag in its response. It takes time for a sensor to sense and signal a change in IC temperature, time for a heater control circuit to respond to a change in sensor apart signal, more time for a heater to change its heat output, and still more time for the heater's increased output to reach and warm the IC's logic circuits.

Hence an abrupt change in input signal frequency can cause a temporary change in IC temperature and therefore the switching speed of its transistors, even when a feedback control system is provided to compensate for temperature changes. We can reduce the range of those temperatures changes by reducing the inherent delay of the feedback system, for example by the making the distances between a logic module, a sensor, a controller and a heater as small as possible. But since we can't entirely eliminate the feedback delay, all feedback-based temperature control systems will have problems controlling IC temperature when there are abrupt changes in input signal frequency.

FIG. 4 illustrates in block diagram form a preferred embodiment of an IC temperature control system in accordance with the invention. This embodiment can be viewed as an improvement to a conventional feedback control system as illustrated in FIGS. 1–3. Like such prior art systems, the preferred embodiment of the invention makes use of feedback to limit slow-moving fluctuations in the temperature of an IC 41. A sensor 42 senses temperature of a logic module 44 and produces an output TEMP. signal of magnitude representing that temperature. A feedback control circuit 46 compares the TEMP. signal magnitude to that of a reference signal signal and transmits a control signal (CONT1) to a heater 48 telling it to increase or decrease its heat production depending on whether TEMP is less than or greater than REF. Heat from heater 48 then flows into the adjacent logic module 44.

Logic module 44 suitably comprises CMOS or similar transistor logic of the type which temporarily increases its heat output when changing logic state. Hence logic module 44 temporarily increases its heat output whenever any one or more of its input signals (INPUT) changes state. In accordance with the invention, a "predictive control circuit" 50, suitably implemented on IC 41, is provided to monitor the INPUT signals to logic module 44. When any of those input signals change state, predictive control circuit 50 signals heater 48 via one or more of a set of control signals (CONT2) to temporarily reduce its heat output. The temporary decrease in rate of heat flowing from heater 48 into logic module 44 helps to compensate for the temporary increase rate of heat generated by logic module 44 so as to limit abrupt changes in temperature of module 44.

Control circuit 50 is a "predictive" circuit in the sense that by monitoring state change in the INPUT signals it can predict when logic module 44 will generate more heat. This contrasts to the feedback system formed by sensor 42, feedback control circuit 46 and heater 48 which can only act to reduce heater output logic module 44 has has already become warmer. Since control circuit 50 predicts when logic module 44 will generate more heat, it can signal heater 48 to reduce its heat output at about the same time logic module 44 begins to generate that heat, rather than some time after logic module 44 has already generated the heat and become warmer because of it.

Thus while the feedback system provided by devices 42, 46 and 48 carries out the basic function of holding IC 41 within a narrow range of temperatures centered about a temperature controlled by the REF signal, predictive control circuit 50 limits short-term variation in total heat produced by logic module 44 and heater 48 so that the feedback system need not contend with fast-moving temperature swings due to abrupt changes in INPUT signal frequency.

Ideally the temporary reduction in heat output of heater 48 should closely match the temporary increase in heat output of logic module 44 and should be timed so that the reduction in heat flow from heater 48 will appear at sensor 42 over the same time period as the increase in heat flow from logic module 44. An optional delay circuit 51 may be provided, when necessary, to delay the arrival of the INPUT signal at logic module 44 to allow the reduction in heat flow rate from heater 48 to arrive at logic module 44 at the same time logic module 44 increases its heat production in response to the change in state of the INPUT signal.

Although IC 41 is shown in FIG. 4 as having only a single logic module 44, it should be noted that IC 41 may have several logic modules and that each logic module may be provided with separate temperature regulation circuits similar to those provided for logic module 44. Generally the accuracy of temperature regulation is improved as we increase the number and decrease the size of independently regulated logic modules.

FIG. 5 illustrates suitable implementations of predictive control circuit 50 and heater 48 of FIG. 4 in more detailed block diagram form. Given a set of N input signals INPUT(1)–INPUT(N), logic module 44 of FIG. 4 is organized into a set of N blocks of gates 44(1)–44(N), each block including gates that switch state in response to a change in state of a corresponding input signal INPUT(1)–INPUT(N). Although not shown in FIG. 4, logic gate blocks 44(1)–44(N) may be interconnected such that states of some gates may be affected by more than one INPUT signal. FIG. 5 details heater 48 of FIG. 4 as a set of N heater elements 48(1)–48(N) each positioned on the IC near a corresponding one of logic gate blocks 44(1)–44(N).

The CONT1 output of feedback control circuit 46 controls the gain of each amplifier 50(1)–50(N). Predictive control circuit 50 includes a set of N pulse generators 50(1)–50(N) each receiving a corresponding one of input signals INPUT(1)–INPUT(N) as input. Each pulse generator 50(1)–50(N) supplies an output pulse to a corresponding amplifier 50(1)–50(N) in response to each edge of its corresponding INPUT signal. Each amplifier 50(1)–50(N) supplies current to a corresponding heater element 48(1)–48(N). The CONT1 output of feedback controller 46 of FIG. 4 is suitably a set of currents CONT1(1)–CONT1(N) that are summed with currents CONT2(1)–CONT2(N) a set to provide current inputs to heater elements 48(1)–48(N). The amount of heat the ith heater element 48($i$) generates is proportional to the magnitude of the sum of its input currents CONT1(i)+CONT2(i).

The output of the ith pulse generator 50($i$) is normally low when input signal INPUT(i) is not changing state. The low output of pulse generator 50($i$) causes inverting amplifier 52($i$) to supply a current CONT2(i) to heater element 48($i$). However when INPUT(i) changes state, the output of pulse generator 50($i$) briefly goes high and amplifier 52($i$) briefly turns off (or greatly reduces) its output current CONT2(i) for an amount of time equal to the switching speed of pulse generator 50($i$). Thus after a change in state of INPUT(i), which causes logic gate block 44($i$) to temporarily increase its heat output, control circuit 50 temporarily reduces its current input CONT2(i) to the adjacent heater element 48($i$) temporarily causing it to reduce its heat output.

The magnitude and duration of temporary heat output reduction of heater 48($i$) occurring after a state change in an input signal INPUT(i) should be designed to match the magnitude and timing of temporary increase in heat production of logic gate block 44 so that they offset one another. The magnitude of heat reduction can be controlled by appropriately adjusting the gain of amplifier 52(i) while the duration of the heat reduction can be controlled by adjusting the pulse width of pulse generator 50(i).

FIG. 6 is a graph illustrating the relationship between average heat flow rate output of a logic module 44(i) and its corresponding heater 48(i) as a function of the frequency of input signal INPUT(i). As input signal frequency increases, the amount of heat logic module 44(i) produces decreases while the amount of heat frequency increases so that the total heat flow rate from logic module 44(i) and heater 48(i) is independent of input signal frequency. The output of control circuit 46 should be adjusted so that heater 48(i) provides a minimum heat flow output (OFFSET) when the input signal is at a maximum expected frequency FMAX.

FIG. 7 illustrates an alternative embodiment of the invention having a predictive control circuit 50 similar to that of FIG. 5. However in the embodiment of FIG. 7, logic module 44 is not organized into separate logic gate blocks and only a single heater element 48 is provided. In such case, feedback control circuit 46 supplies only a single output current CONT1 that is summed with the output currents CONT2(1)–CONT2(N) to provide the current input to heater 48. While the single heater version will be provide sufficient compensation in many applications, the embodiment of FIG. 5 can provide somewhat more accurate heating compensation than that of FIG. 7 because it more accurately distributes heat to parts of the logic module 44 where it is needed.

FIG. 8 illustrates another embodiment 56 of the invention having a logic module 60, a temperature sensor 62, controller 64 and heater 66 similar to devices 44,42,46 and 48 of FIG. 4 and including a predictive control circuit 68 similar to predictive control circuit 50 of FIG. 4. However in FIG. 8, a current mirror 70 in the path between the power supply source VCC for logic module 60 and predictive control circuit 68 supplies to a difference amplifier 74 the sum of the current IA drawn by logic module 58 and the current IB and predictive predictive control circuit 68 to heater 66. Difference amplifier 74 produces an output current IC supplied as additional input to heater 66 of magnitude $$IC=IREF-(IA+IB)$$

where IREF is an input reference current. The total current drawn by heater 77 and logic module 58 is $$I=IA+IB+IC+ID$$

where ID is the current output of controller 64. Since IC=IREF−(IA+IB), then the total current I drawn by heater 77 will be $$I=IREF+ID.$$

The amount of heat generated by logic module 58 and heater 68 is proportional to the sum of the currents they draw. Thus if reference current IREF is constant, the total amount of current drawn by logic module 58 and heater 66 is a function only of variations in ID and is nominally independent of changes in IA and IB. However due to the inherent lag of the feedback loop formed by current mirror 79 and amplifier 74, current IC will not be equal to IREF−(IA+IB) immediately after an abrupt change in IA due to changes in INPUT signal state.

If the temporary reduction in current IB supplied by predictive control circuit 68 in response to a change in state of the INPUT signal were exactly matched to the temporary increase in current IA supplied to logic module 58, then the feedback loop provided by current mirror 70 and amplifier 74 would not be needed to help regulate the temperature of logic module 58; there would be no change in the sum IA+IB and hence no change in total heat generated by logic module 58 and heater 66. However while control circuit 68 can be designed so that the magnitude of current IB can substantially equal the change in current IA following a change in state of the INPUT signal, it would be difficult to adjust IB so that it perfectly offsets the change in IA. Hence there will likely be a small transient in the total heat generated in most implementations of the circuit. The feedback loop provided by current mirror 70 and amplifier 74 reduces that transient because, sensing current rather than temperature, it responds more quickly than the feedback loop provided by temperature sensor 62 and controller 64.

In FIG. 8, current mirror mirrors both IA and IB. However in an alternative embodiment of the circuit of FIG. 8, current mirror 70 can be provided to mirror only current IA while another current mirror can be placed at the output of amplifier 72 to mirror current input IB. Outputs of the two current mirrors are then summed to provide the IA+IB current input to amplifier 74.

Note that since the feedback loop provided by current mirror 70 and amplifier 74 alone will provide a measure of transient temperature damping, predictive control circuit 68 can be omitted from the circuit of FIG. 8 in applications requiring a lesser degree of temperature stabilization.

While the forgoing specification has described preferred embodiment(s) of the present invention, one skilled in the art may make many modifications to the preferred embodiment without departing from the invention in its broader aspects. For example, while in the preferred embodiment of the invention predictive control circuit 50 employs an pulse generator 50 to detect state changes and a current amplifier 52 to provide current to heater 48, those skilled in the art will understand that control circuit 50 can be implemented in other ways. The feedback circuit provided by sensor 20, feedback controller 46 and heater 48 can also be implemented in many ways. Sensor 42 could be thermistor or other heat sensor attached to IC 41 or an internal component implemented within IC 41. In the latter case sensor 42 could, for example, be a diode having a threshold voltage IND that varies with IC temperature. In such cases feedback circuit 46 could compare the IND voltage with a REF signal voltage. Sensor 42 could also be an oscillator implemented on IC 41 having a frequency that varies with IC temperature and feedback circuit would compare frequency of the oscillator output signal (IND) with the frequency of a reference signal (REF) to determine when the logic module 44 is above or below its set point temperature. Heater 48 of FIG. 7 may be implemented either as an external heating element attached to the IC or may implemented by a set of one or more transistors internal to the IC. The appended claims therefore are intended to cover all such modifications as fall within the true scope and spirit of the invention.

What is claimed is:

1. A method for limiting variation in temperature of a digital logic circuit that temporarily increases its heat generation after a digital input signal changes state, the method comprising the steps of:

a. continuously applying heat to said digital logic circuit, b. monitoring said digital input signal to determine when it changes state, and c. temporarily reducing a rate at which said heat is applied to said digital logic circuit upon determining said digital input signal has changed state.

2. The method in accordance with claim 1 further comprising the steps of:
   d. monitoring said temperature of said digital logic circuit; and
   e. adjusting said rate at which said heat is applied to said digital logic circuit in accordance with the monitored temperature.

3. The method in accordance with claim 2 wherein the step of adjusting said rate at which said heat is applied to said digital logic circuit in accordance with the monitored temperature comprises the substeps of:
   e1. increasing said rate of at which said heat is applied to said digital logic circuit when said temperature of said digital logic circuit falls below a predetermined level; and
   e2. decreasing said rate at which said heat is applied to said digital logic circuit when said temperature of said digital logic circuit rises above said predetermined level.

4. The method in accordance with claim 1 wherein an amount by which said rate at which said heat is applied to said digital logic circuit is temporarily reduced at step c is substantially equal to an amount by which said digital logic circuit increases its rate of heat generation after said digital input signal changes state.

5. An apparatus for limiting variation in temperature of a digital logic circuit that temporarily increases its heat production after a digital input signal to the digital logic circuit changes state, the apparatus comprising:
   a heater for applying heat to said digital logic circuit at a variable rate; and
   control means for monitoring said digital input signal and for altering the rate at which said heater applies heat to said digital logic circuit in response to state changes in said digital input signal.

6. The apparatus in accordance with claim 5 wherein said control means temporarily reduces said rate at which said heater applies heat to said digital logic circuit when said digital input signal changes state.

7. The apparatus in accordance with claim 5 wherein said control means temporarily reduces the rate at which said heater applies heat to said digital logic circuit when said digital input signal changes state by an amount that is substantially equal to an amount by which said digital logic circuit increases its rate of heat generation when said digital input signal changes state.

8. The apparatus in accordance with claim 5 wherein said control means also monitors a temperature of said digital logic circuit and adjusts said rate at which said heater applies said heat to said digital logic circuit so as to drive said temperature of said digital logic circuit toward a predetermined temperature.

9. An integrated circuit (IC) comprising:
   a digital logic circuit implemented within said IC for processing a digital input signal, wherein said digital logic circuit temporarily increases its heat production after said digital input signal changes state;
   heating means implemented within said IC for applying heat to said digital logic circuit at a variable rate;
   control means implemented within said IC for monitoring said digital input signal and for altering the rate at which said heater applies heat to said digital logic circuit in response to state changes in said digital input signal.

10. The IC in accordance with claim 9 further comprising a delay circuit for delaying said digital input signal so that it arrives at said digital logic circuit substantially later than it arrives at said control means.

11. The IC in accordance with claim 9 wherein said control means temporarily reduces said rate at which said heater applies heat to said digital logic circuit when said digital input signal changes state.

12. The IC in accordance with claim 9 wherein said control means temporarily reduces the rate at which said heater applies heat to said digital logic circuit when said digital input signal changes state by an amount that is substantially equal to an amount by which said digital logic circuit increases its rate of heat generation when said digital input signal changes state.

13. The IC in accordance with claim 12 wherein said control means comprises:
   first means for monitoring said digital input signal and for generating a pulse in a first control signal whenever said digital input signal changes state; and
   second means for responding to said pulse in said first control signal by temporarily reducing said rate at which said heater applies heat to said digital logic circuit during said pulse.

14. The IC in accordance with claim 13 wherein said first means comprises an exclusive OR gate for producing said first control signal, said exclusive OR gate having a first input receiving said digital input signal and having a second input, said first control signal being fed back to said second input.

15. The IC in accordance with claim 9 wherein said control means also monitors a temperature of said digital logic circuit and adjusts said rate at which said heater applies said heat to said digital logic circuit so as to drive said temperature of said digital logic circuit toward a predetermined temperature.

16. The IC in accordance with claim 15 wherein said control means temporarily reduces said rate at which said heater applies heat to said digital logic circuit when said digital input signal changes state.

17. The IC in accordance with claim 16 wherein
   first means for monitoring said digital input signal and for generating a pulse in a first control signal whenever said digital input signal changes state;
   second means for responding to said pulse in said first control signal by temporarily reducing said rate at which said heater applies heat to said digital logic circuit during said pulse;
   third means for monitoring said temperature of said digital logic circuit and producing a second control signal having a parameter indicative of said temperature; and
   fourth means for performing a comparison of said second control signal with a reference signal indicating said predetermined temperature and for adjusting said rate at which said heater applies heat to said digital logic circuit in accordance with said comparison.

18. An integrated circuit (IC) comprising:
   a digital logic circuit implemented within said IC for processing a digital input signal, wherein said digital logic circuit temporarily increases its heat production after said digital input signal changes state;
   heating means implemented within said IC for applying heat to said digital logic circuit at a rate determined by a magnitude of a control current supplied as input thereto; and
   first control means implemented within said IC for monitoring said digital input signal and for supplying a first portion of said current to said heating means, wherein said control means temporarily alters a magnitude of said first portion of said control current in response to each state change of said digital input signal.

19. The IC in accordance with claim 18 further comprising:
   sensor means for sensing a temperature of said digital logic circuit and for generating an indicating signal having a parameter indicative of said temperature; and
   second control means for adjusting a magnitude of a second portion of said control current in accordance with said parameter of said indicating signal.

20. The IC in accordance with claim 19 further comprising third control means implemented within said IC for monitoring a supply current drawn by said digital logic circuit and for monitoring said second portion of said control current and for adjusting a third portion of said control current in response to a combination of the monitored supply current and second portion of said control current.

21. The IC in accordance with claim 20 wherein a magnitude of said third portion of said control current is substantially equal to a difference between reference magnitude and a sum of magnitudes of said supply current and said third portion of said control current.

22. An integrated circuit (IC) comprising:
   a digital logic circuit implemented within said IC for processing a digital input signal, wherein said digital logic circuit temporarily increases its heat production after said digital input signal changes state;
   heating means implemented within said IC for applying heat to said digital logic circuit at a rate determined by a magnitude of a control current supplied as input to the heating means;
   sensor means for sensing a temperature of said digital logic circuit and for generating an indicating signal having a parameter indicative of said temperature; and
   first control means for adjusting a magnitude of a first portion of said control current in accordance with said parameter of said indicating signal; and
   second control means implemented within said IC for monitoring a supply current drawn by said digital logic circuit and for adjusting a magnitude of a second portion of said control current in response to a magnitude of said supply current.

* * * * *

UNITED STATES PATENT AND TRADEMARK OFFICE
CERTIFICATE OF CORRECTION

PATENT NO.     : 6,484,117 B1
DATED          : November 19, 2002
INVENTOR(S)    : Paul Dana Wohlfarth It is certified that error appears in the above-identified patent and that said Letters Patent is hereby corrected as shown below:

<u>Column 10,</u>
Line 39, -- control means comprises: -- should be inserted after "said".

Signed and Sealed this

Eighteenth Day of February, 2003

JAMES E. ROGAN
*Director of the United States Patent and Trademark Office*